June 7, 1938.  C. K. ANTONOPULOS  2,119,979
DIRECTION SIGNAL SWITCH
Filed Sept. 7, 1937    2 Sheets-Sheet 1
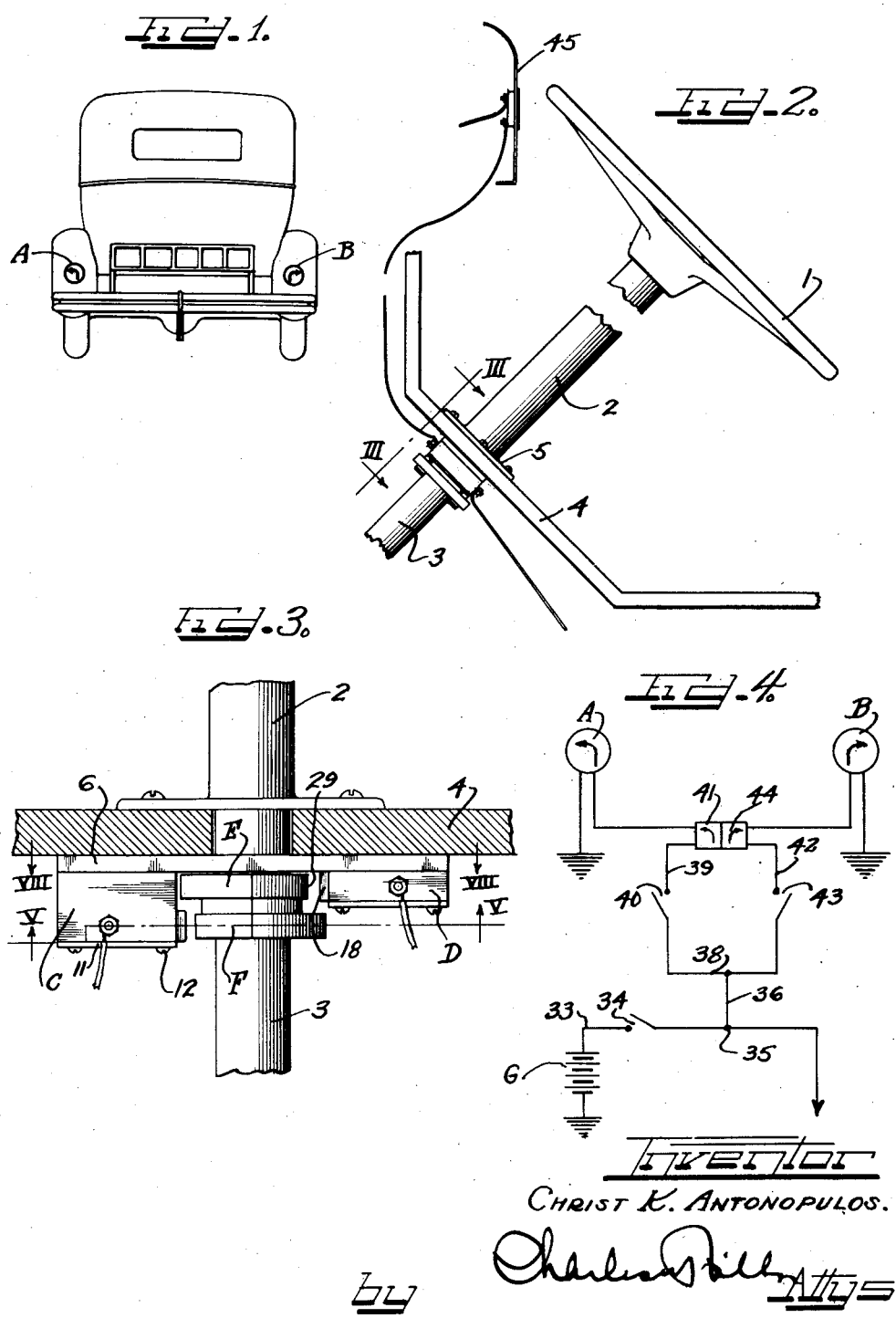
Inventor
CHRIST K. ANTONOPULOS.
by Charles Hill Attys.

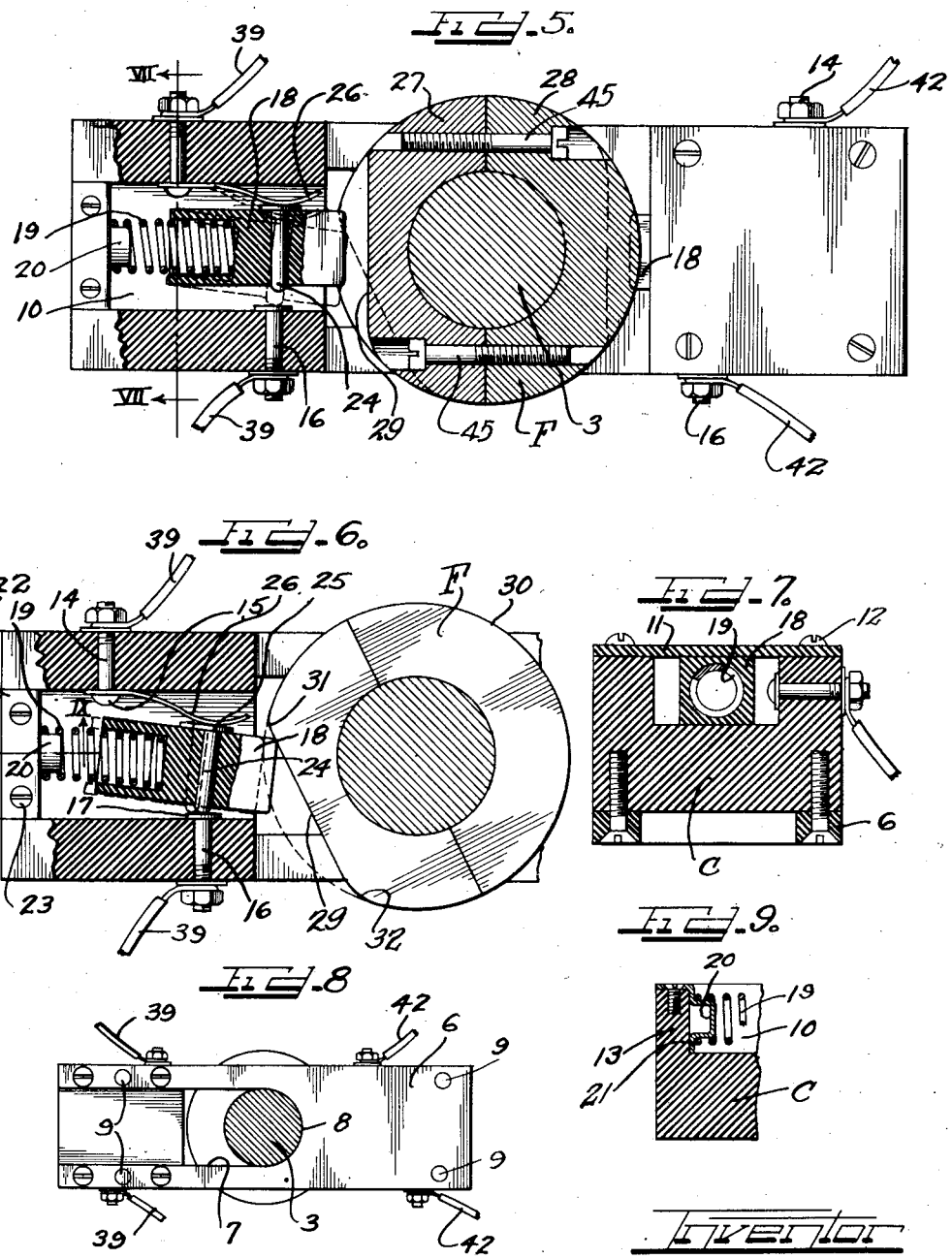

Patented June 7, 1938

2,119,979

UNITED STATES PATENT OFFICE 2,119,979

DIRECTION SIGNAL SWITCH

Christ K. Antonopulos, Chicago, Ill.

Application September 7, 1937, Serial No. 162,602

1 Claim. (Cl. 200—59)

The present invention relates to a direction signal and is particularly applicable to signals for automotive vehicles.

An object of the present invention is to provide a novel direction of turn signal switch for automotive vehicles.

Another object of the present invention is to improve directional signals for automobiles.

A further object of the present invention relates to a switch operative by rotative movement of a steering wheel post of an automotive vehicle for controlling circuit connections to signal devices.

Another and still further object of the present invention is to provide a simple, efficient, sturdy switch mechanism readily applicable to vehicles now in service as well as adapted for installation at the time of manufacture of the vehicles.

The invention has for a further object control means for signals or the like, wherein circuits are automatically closed or opened, in accordance with the movement of a movable part of the structure.

The invention has for a still further object the provision of a signal device operated automatically by movement of the steering wheel to set up the desired signal.

The invention consists in details of construction and the combination and arrangement of cooperating parts whereby important and advantageous results are obtained.

The above, other and further objects of the present invention will be apparent from the following description and the accompanying drawings.

The accompanying drawings illustrate an embodiment of the present invention and the views thereof are as follows:

Figure 1 is an elevational view of the rear end of a conventional automotive vehicle, showing right and left turn signal devices applied to the fenders of the vehicle.

Figure 2 is a fragmental elevational view, somewhat diagrammatic in character, showing the manner of operatively attaching the signal device of the present invention to the steering post of an automotive vehicle.

Figure 3 is an enlarged view taken substantially in the plane indicated by line III—III of Figure 2.

Figure 4 is a wiring diagram.

Figure 5 is an enlarged view, partially in section and partially in elevation, taken substantially in the plane indicated by line V—V of Figure 3.

Figure 6 is a view, partially in section and partially in elevation, of a fragmental portion of the device of Figure 5, showing the position of the parts when one of the cams has been rotated in a manner to close a circuit to one of the signal devices.

Figure 7 is a transverse sectional view taken substantially in the plane indicated by line VII—VII of Figure 5.

Figure 8 is a plan view taken substantially along the line VIII—VIII of Figure 3, and showing the construction of the present device when adapted for application to an automotive vehicle after the construction of the same.

Figure 9 is a fragmental sectional view taken vertically to the plane of the sheet, along the line IX—IX of Figure 6.

The drawings will now be explained.

The vehicle of Figure 1 is supplied with a directional signal A to indicate left turns and another signal B to indicate right turns. The signals are electrically illuminated, and the glass of the faces are provided with arrows appropriately bent to indicate direction of travel.

The device of the present invention is automatically operated by rotative movement of the steering post of the vehicle.

Figure 2 shows a conventional steering apparatus, including a steering wheel 1, a steering column 2 which encloses the post 3. The column 2 is fastened to the floor board 4 by means of a flange 5 integral with the column and suitably riveted or bolted in place.

Underneath the floor board 4 the switch mechanism is attached to the steering post 3.

The switch device includes a base plate 6 which, in the present instance, is provided with a slot 7 adapted to pass about the steering post 3, which slot terminates in an arcuate end 8 to position the base plate with respect to the steering post. The plate is provided with apertures 9 for receiving screws, bolts, or other attaching means to fasten it in place against the floor board 4.

Attached to the underside of the face plate 6 are casings C and D preferably fashioned of insulating material such as fiber, "Bakelite", or other suitable material. As illustrated, the casing C is of greater depth than the casing D, for a purpose to be later explained.

Secured to the post 3 are cams E and F which are arranged in closely adjacent axially spaced relation with the upper cam E closely adjacent the base plate 6.

The casing C contains switch mechanism for controlling circuit conditions to the signal A, which is a left turn, while the casing D is provided with switch mechanism for controlling circuit conditions to the signal device B, the right turn indicator.

The casing C is provided with a longitudinally extending recess 10 which opens through the bottom of the casing, and is normally closed by a plate 11, held in place by screws or bolts 12. The recess 10 terminates at its left hand end in a wall 13, as may be observed in Figure 9. Passing through one of the walls of the recess 10 is a terminal post 14, having a head 15 within the recess, and passing through the opposite wall of the recess 10 is another terminal post 16 having an enlarged head 17 within the recess. The posts 14 and 16 are misaligned longitudinally of the casing.

Floatingly mounted within the recess 10 is a block 18 counterbored at its inner end to receive a coil spring 19. The counterbore is of sufficient depth and the spring is of sufficient tension to normally maintain the block in the full line floating position, of Figure 5, which is the normal position of the block. The spring 19 is supported on a boss 20 which is formed as a part of a plate 21 secured against the inner surface of the end wall 13 of the recess 10. The plate extends transversely of the recess 10, against the end wall 13 and has an angular portion 22 against the edge margin of the wall, through which screws 23 are passed to hold the plate in position, as may be viewed in Figures 5, 6 and 9.

The block 18 carries a pin 24 extending transversely through it, in alignment with the terminal posts 16. As illustrated, the pin 24 projects from the side of the block 18 which is adjacent the terminal post 16 to make contact with the head 17 of the post, while the other end of the pin is provided with an enlarged flat head 25 against which rests one end of a spring contact finger 26, the other end of the finger being secured to the terminal post 14 between its head 15 and the adjacent side surface of the recess of the casing. By this construction electrical connection between the terminal post 14 and the pin 24 of the block 18 is maintained regardless of the position of the block within its recess.

The cam E is illustrated as comprising two halves 27 and 28 for surrounding the post 3 and which are held together by bolts 45 suitably entered in the halves.

The cam E is provided with a flat face 29 and a circular or arcuate face 30, the arcuate face constituting a major portion of the periphery of the cam.

As the parts are illustrated in the accompanying drawings, the block 18 in the casing C is adapted to be rocked into a circuit closing relation with respect to the terminal post 16 by counterclockwise movement of the steering post 3 and the cam F.

Normally, when the wheels of the vehicle are straight ahead, the flat face 29 of the cam F is substantially in the position of Figure 5, that is spaced from the adjacent end of the block 18, with the block in its normal or central position as shown in full lines in Figure 5. The face 29 of the cam merges with the face 30, as what is herein termed the upper end of the face 29, on a radius making a rounded corner 31, which radius is relatively short so that the corner thus formed is sharp. The other end of the flat face 29 merges with the arcuate portion 30 on a rounded surface 32 described on a greater radius so that this corner is relatively blunt.

Referring to Figure 4, leading from the battery G is a conductor 33 in which is interposed the ignition switch 34. The conductor 33 leads to the engine, the other side of the battery is grounded and the engine is grounded as is common practice.

Branching from the conductor 33 at 35 is a conductor 36 electrically connected at 37 to another branch 38. Interposed between one end of the branch 38 and the signal A, left hand indicator, is the conductor 39 in which is interposed a switch 40 and a tell-tale series lamp 41, which latter is preferably mounted on or adjacent the dash of the vehicle. If desired, tell-tale may be duplicated in rear compartment of vehicle.

Leading from the other end of the conductor 38 is a conductor 42 to the other signal element B, the right hand indicator, in which conductor is a switch 43 and a tell-tale 44. As is common practice the signal devices A and B are grounded.

The switch 40 in the conductor 39 is the one contained in the casing C, while the switch 43 in the conductor 42 is the one contained in the casing D.

Referring to Figures 5 and 6, with the steering post 3 and the cam F in the position of Figure 5, the switch 40 to the signal device A and the switch 43 to signal device B are open.

When the steering post is operated to turn the wheels to the left, the sharp corner 31 will bear against adjacent edge margin of the block 18 and rock it from the full line position of Figure 5 to the full line position of Figure 6. Such rocking movement of the block establishes electrical contact between the pin 24 and the terminal post 16 thus energizing the light in the directional device A. As the steering post is turned farther in counterclockwise direction, sometimes several revolutions being necessary, the circular face 30 of the cam will engage against the end of the block 18 and urge it to the left, as indicated by dotted lines in Figure 6. As rotative movement of the post and cam continues, there is sufficient frictional engagement between the face 30 of the cam and the end of the block 18 to maintain it in tilted engagement against the terminal post 16, thus holding the block in circuit closing position. As the cam F is rotated in counterclockwise direction, and several rotations thereof are necessary to accomplish the degree of turn desired by the driver, the flat face 29 of the cam will move around to a point where the end of the block 18 rides over the blunt corner 32 whereupon the spring 19 becomes effective to return the block to its normal position, which is that of full lines in Figure 5, thus breaking the circuit to the signal device A. However, as the rotation of the post and cam continues, the block will again be moved into circuit closing relation. Where several rotations of the post are necessary, it will consequently follow that the signal device A will be repetitively illuminated thereby increasing its value as a signal element.

When the steering post and cam F have been rotated a sufficient number of times in counterclockwise direction, post and cam then are rotated in the opposite direction, to straighten the front wheels. Such a rotative movement in counter direction, will move the block 18 away from the terminal post 16 and into the normal position of Figure 5, and perhaps slightly beyond in the opposite direction, the block vibrating, to a limited extent, due to the rotative movement of the circular surface 30 of the cam against its end. During the movement of the block as described, an electrical connection between the post 14 and the pin 24 is maintained by the spring finger 26.

The operation thus described relates to the automatic closing of the electric circuit including the directional indicator A.

The directional indicator B is controlled by switch mechanism within the casing D, of the same character as just described. However, in connection with switch mechanism in the casing D, to close the switch 43 to the indicator B, the cam E is constructed exactly like the cam F, but arranged with its flat face on the opposite side of the center line of the post, as is indicated by the dotted lines in Figure 5.

When the steering post 3 and cam are rotated in clockwise direction, the flat face 29 of the cam E will engage the end of the block 18 in the casing D, and rock it downwardly, as viewed in Figure 5, to close the switch 43 to the directional indicator B.

The operation of the switch in the casing D is the same in all respects as described with reference to the switch mechanism within the casing C, except that the switch mechanism within casing D is closed when the post is given rotative movement in clockwise direction as viewed in the drawings.

It is to be understood that when the post 3 is given rotative movement in counterclockwise direction, the signal member A is put in circuit, the other member B remaining out of circuit by reason of the arrangement of the terminal posts with respect to the floating block 18 in the recesses. During the rotative movement of the steering post 3 in counterclockwise direction, the circular face 30 of the cam E will bear against the end of the block 18 and move it inwardly slightly to the same extent that the block 18 in recess 10 of the casing C is moved, as indicated by dotted lines in Figure 5.

When the post is given rotative movement in clockwise direction, the switch 43 to the indicator B is closed, the switch to the indicator A remaining out of circuit.

In order to advise the vehicle operator of the fact that either of the directional indicators A or B is in circuit, tell-tales 41 and 44 are interposed in the circuits to the indicators A and B, respectively. Preferably these tell-tales are disposed on the instrument board, or near it, and are in series with the indicators A and B.

The device of the present invention has been herein described as constructed for application to automotive vehicles already in use. That is to say, if the device were to be constructed for application at the factory of the manufacturer of the automobile, the base plate 6 preferably would not be slotted as at 7, instead being centrally apertured to be passed over the steering post 3 as the post is assembled.

The manner of mounting the springs 19 in the recesses of the casings, enables any replacement of a spring when it loses its effectiveness or perchance breaks. To remove a spring, all that is necessary to be done is to remove the cover plate for the recess of the particular casing, remove the screws 23 and the plate 22 whereupon the whole plate including the boss and spring, may be removed and the spring replaced with a new one, mounting one end up on the boss and inserting the other end in the counterbore of the block whereupon the plate is then fastened in place by the screw 23 and the cover plate applied.

Figure 2 illustrates the manner of mounting the tell-tales 41 and 44 in the instrument board 45.

It will be observed that the device of the present invention is sturdily built, and is so designed as to be manufactured at low cost thereby permitting its sale at satisfactory prices. Furthermore, the device of the present invention is one which when once applied, is automatic in its operation thereby relieving the driver of the vehicle from any concern relating to the operation of the directional signals.

Figure 7 is upside down from the position normally occupied when the device is applied to the steering post of a vehicle.

The casings C and D are arranged so that the floating blocks 18 therein are arranged at different axial planes, in order to register with the cams E and F which are axially spaced on the post 3.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

A direction of turn signal light device for vehicles comprising in combination with the steering post of the vehicle, two cams secured to said post in closely adjacent and axially spaced relation, casings supported adjacent said cams, each casing having a recess with an end opening adjacent its cam, terminal posts in the sides of each recess with the posts in a recess misaligned, a floating block in each recess carrying a conductor pin positioned to make electrical contact with one of the terminal posts of a recess, a resilient conductor from the other terminal post of said recess to said conductor pin to maintain said pin in electrical connection with said other post regardless of the movement of said block, a spring mounting for said block effective to normally hold it and its pin away from said one terminal post, a cam having a face portion which on initiation of rotative movement in one direction will engage the block in its recess and rock it in a manner to move said pin into electrical contact with the said one terminal post of said recess and having another face which engages the end of the block while in rocked position to move the block endwise and by frictional engagement therewith due to continued rotation of the cam maintain said block in rocked circuit closing position with respect to said one terminal post.

CHRIST K. ANTONOPULOS.